No. 789,397. PATENTED MAY 9, 1905.
F. L. O. WADSWORTH.
APPARATUS FOR MAKING GLASS ARTICLES.
APPLICATION FILED AUG. 21, 1902.
2 SHEETS—SHEET 1.
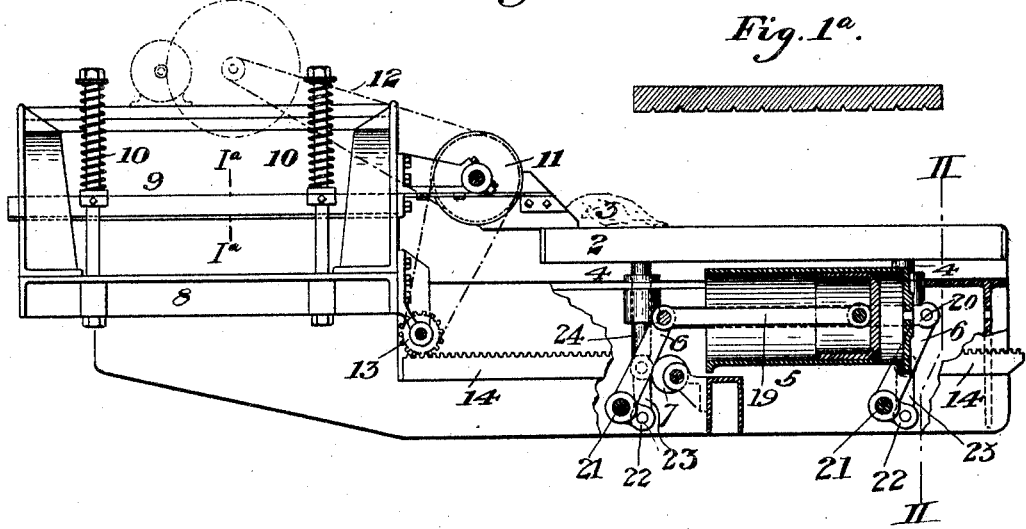
Fig. 1.
Fig. 1a.
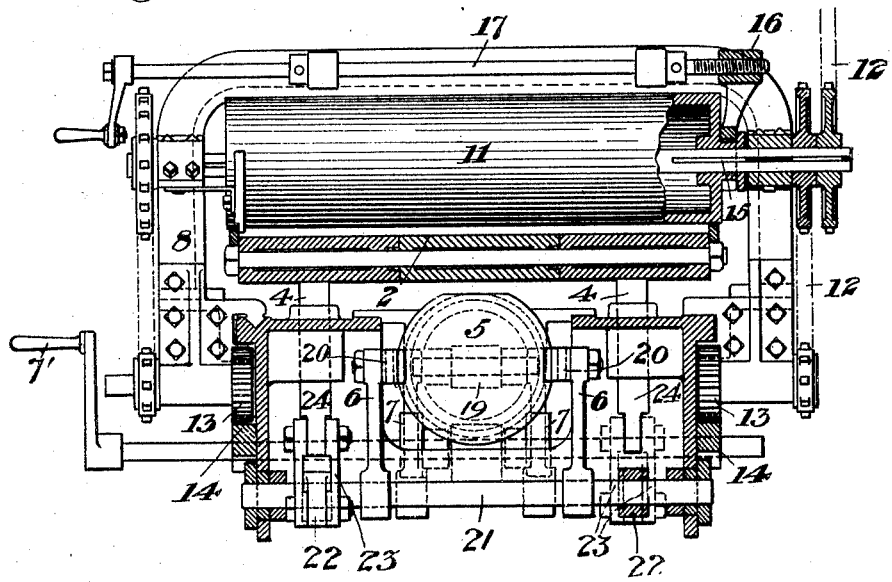
Fig. 2.
WITNESSES
Thomas W. Bakewell
INVENTOR
Frank L. O. Wadsworth No. 789,397. PATENTED MAY 9, 1905.
F. L. O. WADSWORTH.
APPARATUS FOR MAKING GLASS ARTICLES.
APPLICATION FILED AUG. 21, 1902.

2 SHEETS—SHEET 2.

WITNESSES
Thomas W. Bakewell
L. A. Conner

INVENTOR
Frank L. O. Wadsworth

No. 789,397.

Patented May 9, 1905.

UNITED STATES PATENT OFFICE.

FRANK L. O. WADSWORTH, OF ALLEGHENY, PENNSYLVANIA, ASSIGNOR TO PRESSED PRISM PLATE GLASS COMPANY, OF NEW YORK, N. Y., A CORPORATION OF WEST VIRGINIA.

APPARATUS FOR MAKING GLASS ARTICLES.

SPECIFICATION forming part of Letters Patent No. 789,397, dated May 9, 1905.

Application filed August 21, 1902. Serial No. 120,592.

*To all whom it may concern:*

Be it known that I, FRANK L. O. WADSWORTH, of Allegheny, in the county of Allegheny and State of Pennsylvania, have invented a new and useful Apparatus for Making Glass Articles, of which the following is a full, clear, and exact description, reference being had to the accompanying drawings, forming part of this specification, in which—

Figure 3:
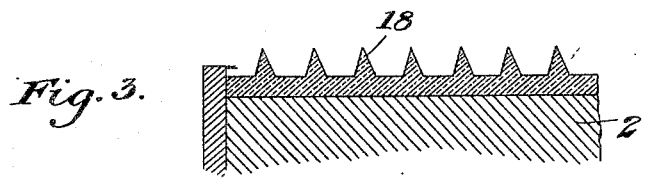
Figure 4:
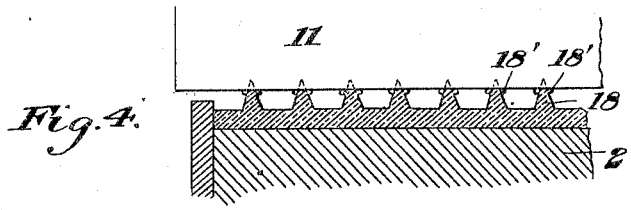
Figure 5:
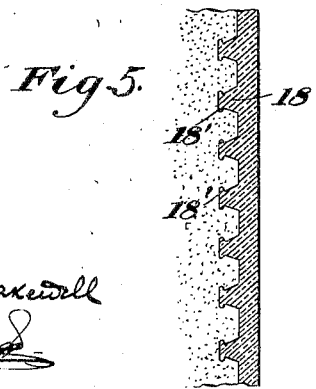

Figure 1 shows in side elevation, partly in vertical section, a machine embodying my invention. Fig. 1$^a$ is a cross-section of the molding-plate, hereinafter described, taken on the line I$^a$ I$^a$ of Fig. 1. Fig. 2 is a vertical cross-section on the line II II of Fig. 1, showing one end of the roll in section. Fig. 3 is a sectional view showing a glass plate with projecting ribs formed thereon by the machine shown in Fig. 1, and Fig. 4 illustrates the subsequent operation in which these ribs are flattened by a roller. Fig. 5 shows in section a glass tile which has been shaped by my apparatus and is held in place with cement.

My invention is primarily designed for the manufacture of glass tiles having ribs or projections formed on the rear surface and flattened or widened at their ends, so as to form keys for holding the tiles to a bed of cement.

My invention in one of its features consists in apparatus for molding a glass plate with such projections or ribs and then applying pressure to such molded projections or ribs and flattening or expanding them. My invention enables me to practice these steps when the relative position of the glass sheet and the molding instrument are changed after the projections or figures have been formed, and the molding-surface is remolded or refigured by bringing different portions of it again into contact with the molding-surface.

Figs. 1, 2, 3, and 4 illustrate one form of the apparatus for the practice of my invention. In these figures, 2 is a table on which the body of plastic glass 3 to be molded is placed. This table is mounted upon a plurality of standards 4, adapted to be moved vertically, preferably by a cylinder 5 and intermediate positive connecting mechanism, which consists, preferably, of a pitman 19, connected with the cylinder and connected by levers 6 and rods 20 to shafts 21, which by levers 22 and links 23 are connected to vertical slides 24, by which the table is guided in its vertical motion. The cylinder is provided with suitable fluid-supply connections, the rise of the table being effected by the admission of fluid and its descent being effected by gravity. The position of the table when at its lowest point is determined by an adjustable stop consisting, preferably, of an eccentric 7, which is adapted to be engaged by and to stop part of the connecting mechanism 6. 8 is a carriage on which a molding-plate 9 is mounted and is preferably backed yieldingly by springs 10, and on the carriage is a roll 11, which may have a plain face and is rotated by suitable power connections 12. The carriage is capable of horizontal motion to bring the roll 11 and plate 9 successively over the table 2, and for this purpose I may employ on the table driven pinions 13, which engage with stationary racks 14. The roll 11 may be movable lengthwise of its axis for the purpose of adjustment. This is not necessary where the roll is plain, but is employed when it is grooved, as described below. Such adjustment may be effected by mounting the roll slidingly on its shaft with a keyway 15 and providing a nut 16 and screw-shaft 17 for moving it.

The operation is as follows: The table 2 is set in its lowest position permitted by the eccentric 7, which has been adjusted by a handle 7' to secure the desired thickness of glass, the plastic glass is placed thereon, and the carriage 8 is advanced so as to move the roll 11 over the glass and to flatten it upon the table into a flat sheet. Further advance of the carriage moves the roll beyond the table and brings over the glass the molding-plate 9, whose under surface is formed with grooves of suitable shape to impress upon the glass the desired ribs or projections. Then by actuating the cylinder 5 the table is raised, and the glass sheet being pressed thereby against the plate 9 is molded with the projections or ribs 18. (Shown in Fig. 3.) The table is then lowered by reverse operation of the cylinder, and the stop 7 is adjusted so as to permit it to descend farther than the position which it occupied during the operation of the roll. The carriage 8 is then moved in the reverse direction, so as to carry the roll 11 over the molded glass sheet, and as the surface of the roll comes into contact with the edges of the projections 18 it acts thereon at right angles to the surface of the sheet and flattens or expands the projections into the form of keys 18', as shown in Fig. 4. The shaping of the glass sheet is thus completed, and after the necessary annealing and cutting it is ready for use as tiles, as shown in Fig. 5.

I claim—

1. Apparatus for making glass articles which consists in the combination of a table, means for forming projecting ribs on the glass, a roll for flattening such ribs, and means for adjusting the table vertically between said operations; substantially as described.

2. Apparatus for making glass articles which consists in the combination of a table for holding the glass, a carriage carrying a forming-die and roll, and means for moving the carriage over the table; substantially as described.

3. Apparatus for making glass articles which consists in the combination of a table for holding the glass, a carriage carrying a forming-die and roll, means for moving the carriage over the table, and means for adjusting the table vertically; substantially as described.

4. In apparatus for making glass articles, in combination, a table, a grooved molding-plate movable into operative relation with said table and in a plane parallel thereto, a plurality of supports for the table, a movable piston and positive connections between the piston and the table-supports for moving said supports simultaneously and through equal distances; substantially as described.

5. In apparatus for making glass articles, in combination, a molding-plate, a table movable toward and from said molding-plate, a roll laterally movable with respect to the table, a plurality of supports for the table, a movable piston, positive connections between the piston and supports for moving the said supports simultaneously and through equal distances, and an adjustable stop for the table in its lowered position; substantially as described.

In testimony whereof I have hereunto set my hand.

FRANK L. O. WADSWORTH.

Witnesses:
GEORGE B. BLEMING,
L. M. REDMAN.